United States Patent [19]
McAtee et al.

[11] 3,882,939

[45] May 13, 1975

[54] MOBILITY CONTROL IN ADJACENT WELLBORES

[75] Inventors: Richard W. McAtee, Littleton; Marvin A. Svaldi, Morrison, both of Colo.

[73] Assignee: Marathon Oil Company, Findlay, Ohio

[22] Filed: May 14, 1973

[21] Appl. No.: 359,816

[52] U.S. Cl. ............................... 166/274; 166/273
[51] Int. Cl. ............................................. E21b 43/22
[58] Field of Search ........ 166/274, 275, 273, 305 R; 252/8.55 D

[56] References Cited
UNITED STATES PATENTS

| | | | |
|---|---|---|---|
| 3,519,077 | 7/1970 | Odeh .................................. | 166/274 |
| 3,532,166 | 10/1970 | Williams ............................ | 166/274 |
| 3,581,824 | 6/1971 | Hurd ................................. | 166/273 X |
| 3,684,014 | 8/1972 | Norton et al. .................... | 166/273 X |
| 3,724,545 | 4/1973 | Knight .............................. | 166/273 |
| 3,766,983 | 10/1973 | Chiu ................................. | 166/274 |
| 3,768,560 | 10/1973 | Hill et al. ......................... | 166/274 |
| 3,776,310 | 12/1973 | Norton et al. .................... | 166/274 X |

*Primary Examiner*—Stephen J. Novosad
*Attorney, Agent, or Firm*—Joseph C. Herring; Richard C. Willson, Jr.; Jack L. Hummel

[57] ABSTRACT

Improved flooding of subterranean reservoirs with an aqueous biopolymer solution is accomplished by incorporating 10–2,000 ppm of a polyalkylene oxide polymer in the front portion, e.g. up to 20 percent of the solution. Without the polyalkylene oxide polymer, the solution exhibits a decrease in viscosity upon increase in shear rate providing unfavorable mobility control. By incorporating polyalkylene oxide polymer, the solution "thickens" on increased shear rates. This combination provides good mobility control in adjacent wellbores. A miscible or miscible-like displacement slug can precede the aqueous biopolymer slug.

6 Claims, No Drawings

MOBILITY CONTROL IN ADJACENT WELLBORES

BACKGROUND OF THE INVENTION

1. Field of the Invention

This invention relates to injecting an aqueous mobility control slug into a subterranean reservoir to displace hydrocarbon from the reservoir. A miscible-like slug can precede the aqueous mobility buffer and the buffer followed by a water drive.

2. Description of the Prior Art

The art uses mobility control agents to improve oil recovery in waterflooding operations. Examples of patents teaching this flooding technology include U.S. Pat. No. 2,731,414 to Binder, Jr. et al; U.S. Pat. No. 2,771,138 to Beeson; U.S. Pat. No. 2,827,964 to Sandiford; U.S. Pat. No. 2,843,545 to Wolfe; U.S. Pat. No. 3,002,960 to Kolodny; U.S. Pat. No. 3,039,529 to McKennon; U.S. Pat. No. 3,067,161 to Roth; U.S. Pat. No. 3,282,337 to Pye; U.S. Pat. No. 3,370,647 to Wolgemuth; etc. The mobility buffer slug can be preceded by a miscible or miscible-like displacing agent, e.g. see U.S. Pat. Nos, 3,254,714 to Gogarty et al; 3,497,006 to Jones et al; 3,506,070 and 3,506,071 to Jones; etc.

Many polymers are polyelectrolytes, e.g. a high molecular weight, partially hydrolyzed polyacrylamide and lose their viscosity imparting property with increasing salt concentrations in the formation water. Therefore, it is advantageous to use biopolymers which are relatively insensitive to ions within the formation as mobility control agents. An example of flooding with a biopolymer is taught in U.S. Pat. No. 3,305,016 to Lindblom et al.

In flooding a porous medium with an aqueous biopolymer solution, the viscosity of the solution tends to decrease with increasing shear rates. Thus, in a linear displacement system, as the frontal advance rate is increased, the effective viscosity of the aqueous polymer solution decreases. This is a very desirable property to have in a mobility control agent for radial displacement systems, e.g. field application. That is, with increasing distance from the wellbore, the shear rate grades exponentially from high to low--as a result, the effective viscosity grades from low to high as a function of the distance from the well bore. With the proper fluid design, this allows the following to happen:

1. relatively high injection rates because the near wellbore area "sees" a relatively low effective fluid viscosity, and,
2. mobility control away from the wellbore because these regions "see" a relatively high effective fluid viscosity. However, this phenomenon presents a problem in displacing the fluids away from the near wellbore area with sufficient mobility control to insure frontal conformance. In the near wellbore areas, you have high shear rates causing the aqueous biopolymer solution to have low viscosity resulting in poor mobility control. Applicants have discovered that by admixing polyalkylene oxide polymer into the front portion of the aqueous biopolymer solution, mobility control can be obtained in the near wellbore area of the injection well. Thus the advantages of the aqueous biopolymer solution and mobility control can be obtained in the near wellbore areas of the injection wells.

SUMMARY OF THE INVENTION

To improve flooding with biopolymers, Applicants have incorporated into the front portion of the aqueous biopolymer solution a polyalkylene oxide polymer which exhibits an effective increase in viscosity upon increase in shear rate. About 0.1 to about 20 percent of the aqueous biopolymer solution contains about 10–2,000 ppm of the polyalkylene oxide polymer.

DESCRIPTION OF THE PREFERRED EMBODIMENTS

The aqueous biopolymer solution is especially useful in secondary and/or tertiary recovery processes. Hydrocarbon displacing slugs can be injected previous to the biopolymer solution and drive slugs, e.g. water, gases, etc., can be injected to displace the aqueous biopolymer solution through the reservoir. The biopolymer solution is usually injected in an injection well in fluid communication with the hydrocarbon containing subterranean reservoir and displaced toward a production well to recover hydrocarbon therethrough.

Examples of useful biopolymers include those defined in U.S. Pat. No. 3,305,016 to Lindblom et al. Commercially available biopolymers include those manufactured by Xanco, a division of Kelco Company, San Diego, California, and identified under the trademark Kelzan-M, Kelzan-MF, Kelzan-XC, etc. Kelzan-M is a heteropolysaccharide produced by the action on a carbohydrate of the bacterial specie Xanthomonas campestris. Other species of the genus Xanthomonas which are useful in biopolymer production include Xanthomonas phaseoli, Xanthomonas malvacearum, Xanthomonas carotae, Xanthomonas translucens, Xanthomonas hederae, and Xanthomonas papavericola. Biopolymers generally exhibit molecular weights in the range of about 200 to about 300,000 or more.

Concentration of the biopolymer in the aqueous solution can be about 100 to about 2,000 or more and preferably about 250 to about 1500 and more preferably about 500 to about 1,000 ppm. Pore volumes of about 10 to about 150 percent and preferably about 15 to about 100 percent and more preferably about 25 to about 75 percent are particularly useful in secondary and tertiary oil recovery. Larger volumes can be used if desired. The aqueous biopolymer solution can contain other additives to impart desired properties to the process, e.g. surfactants, cosurfactants, electrolytes, sacrificial agents to occupy adsorption sites on the reservoir rock, etc.

The front portion of the aqueous biopolymer solution contains a polyoxyalkylene oxide polymer. Generally, about 0.1 to about 20 percent and preferably about 0.2 to about 10 percent and more preferably about 0.5 to about 5 percent of the front portion of the biopolymer solution contains the polyalkylene oxide polymer. Concentrations of the polyalkylene oxide polymer can be about 10 to about 2,000 and preferably about 100 to about 1500 and more preferably about 150 to about 1,000 ppm. The polyalkylene oxide polymer is compatible with the biopolymer.

The polyalkylene oxide polymer includes high molecular weight polyethylene oxide polymers, polypropylene oxide polymers, and polybutylene oxide polymers, etc. Any polyalkylene oxide polymer is useful as long as it is water soluble. Also, the polyalkylene oxide polymer can be chemically modified, desirably to obtain improved viscosity characteristics at increased shear rates. Molecular weights of the polyalkylene oxide polymers can be about 10,000 to about 10,000,000, or more, and preferably about 600,000 to about 7,500,000 and more preferably about 4,000,000 to about 6,000,000. The desired molecular weight is generally dependent upon the average permeability of the reservoir being flooded, but the above ranges are generally suited for most applications. Preferably, the polyalkylene oxide polymer is a polyethylene oxide polymer and more preferably is one commercially available from Union Carbide Co., 270 Park Avenue, New York, New York, 10017, U.S.A. under the trademark "Polyox Coagulant" or "Polyox WSR 301." These polymers are generally insensitive to formation fluids and will not substantially reduce the permeability of the reservoir rock. The polyalkylene oxide polymer can be complexed with other polymers, for example, natural resins such as any unmodified resin, e.g. copal or a dammar from a natural source such as a tree, or a modified resin from such source, tannic acid and the lignosulfonates, e.g. calcium and sodium lignosulfonates. An example of a complex with a polyalkylene oxide is a combination of polyethylene oxide (Polyox Coagulant), and calcium lignosulfonate (Airecon, a trademark of Union Carbide Company, New york, N.Y.) at concentrations of 20 parts by volume of 1000 ppm of the polyethylene oxide polymer in distilled water and 1 part by volume of 25 percent of the calcium lignosulfonate. This complex exhibits extremely elastic properties.

The water used to make up the aqueous biopolymer solution can be soft water, saline water or a brine. Generally speaking, water containing up to 50,000 ppm of TDS (total dissolved solids, these waters can contain up to 5,000 ppm of divalent cation) are generally useful. However, the water preferably contains less than about 20,000 ppm of TDS and a general guide for desired water is one containing about 100 to about 20,000 ppm of TDS.

Preferably a displacement slug precedes the aqueous biopolymer solution. This displacement slug is preferably a miscible or miscible-like displacement slug. Specific examples include oil-external and water-external micellar dispersions (this term includes micellar solutions, microemulsions, "transparent" emulsions, hydrous soluble oils, etc.), oil-external and water-external emulsions, soluble oils, etc. Examples of these agents are found in U.S. Pat. Nos. 3,254,714 and 3,275,075 to Gogarty et al; 3,506,070 and 3,506,071 to Jones; 3,497,006 to Jones et al; 3,330,344 and 3,348,611 to Reisberg; 3,373,809 to Cooke, Jr.; 3,149,669 to Binder et al; 3,163,214 to Csaszar; 3,208,515 to Meadors; 3,208,517 to Binder, Jr. et al; 3,354,953 to Morse; 3,512,586 to Holm; 3,697,424 to Holm; 3,714,062 to Askew et al; and 3,500,919 to Holm.

The art teaches how to inject aqueous polymer solutions into the reservoir and how to decrease the concentration of the polymer from front to rear to obtain improved mobility control. For example U.S. Pat. No. 3,467187 to Gogarty et al teaches an effective method of designing polymer concentrations within a mobility buffer slug to obtain efficient mobility control.

The following examples are presented to teach specific working embodiments of the invention. Unless otherwise specified, all percents are based on weight.

EXAMPLE 1

A Berea Sandstone disc 2 inches thick and 6 inches in diameter is first cleaned and is thereafter flooded with water and then with crude oil (viscosity 7 cp. at 23°C) to residual water saturation and thereafter with water to residual oil saturation. Then, 7 percent formation pore volume of an oil-external micellar solution is injected into the disc followed by 50 percent pore volume of an aqueous solution containing 750 ppm of biopolymer (Kelzan-MF) and containing 500 ppm of a polyethylene oxide polymer (Polyox polymer) within the front 10% of the aqueous biopolymer solution, and this, in turn, is followed by drive water. Substantially all of the residual oil is displaced from the core sample.

EXAMPLE 2

A subterranean reservoir approximately 1500 feet deep and containing an average of 20 feet of porous hydrocarbon-containing rock is flooded with 7.5 percent formation pore volume of a water-external micellar dispersion. This is followed by 10 percent formation pore volume of an aqueous biopolymer solution containing 750 ppm of Kelzan-MF polymer and 500 ppm of a polyethylene oxide polymer (Polyox Coagulant). Thereafter, 60 percent formation pore volume of an aqueous biopolymer solution containing 250 ppm of the Kelzan MF polymer is injected and thereafter a drive water is injected to displace the previously injected slugs toward a production well in fluid communication with the hydrocarbon containing reservoir. Substantial quantities of the hydrocarbon are displaced from the reservoir.

All equivalents obvious to those skilled in the art are intended to be incorporated within the scope of the invention as defined in the specification and appended claims.

What is claimed is:

1. In a process of flooding a hydrocarbon containing reservoir having an injection means in fluid communication with a production means and wherein an aqueous biopolymer solution is injected into the reservoir and displaced toward the production means to recover hydrocarbon therethrough, the improvement comprising incorporating into only the front portion of the biopolymer solution a polyalkylene oxide polymer to obtain improved mobility control in areas near the injection means.

2. In a process of recovering hydrocarbon from a hydrocarbon containing subterranean reservoir having an injection means in fluid communication with a production means and wherein an aqueous biopolymer solution is injected into the reservoir and displaced toward the production means to recover hydrocarbon therethrough and wherein the aqueous biopolymer solution exhibits a decrease in viscosity upon increase in shear rate, the improved process comprising incorporating about 100 to about 2,000 ppm of a polyalkylene oxide polymer in the front portion of the aqueous biopolymer solution said front portion comprising up to about 20% of the solution, the effect being to obtain better mobility control in the areas near the injection means.

3. The process of claim 2 wherein a miscible or miscible-like displacement slug is injected previous to the injection of the aqueous biopolymer solution.

4. The process of claim 2 wherein about 10 to about 150% formation pore volume of the aqueous biopolymer solution is injected into the reservoir.

5. The process of claim 4 wherein about 100 to about 2,000 ppm of the biopolymer is admixed into the aqueous biopolymer solution.

6. The process of claim 2 wherein the polyalkylene oxide polymer is a polyethylene oxide polymer.

* * * * *